United States Patent [19]
Edgerton

[11] 4,424,410
[45] Jan. 3, 1984

[54] SPLICE CONNECTOR WITH SHIELD BREAK

[75] Inventor: Nelson W. Edgerton, Martinsville, N.J.

[73] Assignee: Amerace Corporation, New York, N.Y.

[21] Appl. No.: 418,810

[22] Filed: Sep. 16, 1982

Related U.S. Application Data

[63] Continuation of Ser. No. 174,867, Aug. 4, 1980, abandoned, which is a continuation-in-part of Ser. No. 970,190, Dec. 18, 1978, abandoned.

[51] Int. Cl.³ .......................................... H02G 15/184
[52] U.S. Cl. ..................................... 174/73 R; 174/85
[58] Field of Search ................... 174/73 R, 73 SC, 85, 174/88 C

[56] References Cited

U.S. PATENT DOCUMENTS

| | | | |
|---|---|---|---|
| 425,961 | 4/1890 | Seubel | 174/85 |
| 1,757,561 | 5/1930 | Emmons | 174/85 X |
| 1,760,546 | 5/1930 | Eby | 174/85 X |
| 1,784,881 | 12/1930 | Rah | 174/85 |
| 3,155,787 | 11/1964 | Imhof | 174/73 R X |
| 3,717,717 | 2/1973 | Cunningham et al. | 174/73 R |
| 3,761,602 | 9/1973 | DeSio et al. | 174/73 SC |
| 3,796,821 | 3/1974 | Lusk | 174/73 R |
| 3,800,064 | 3/1974 | Lusk | 174/73 R |
| 3,801,730 | 4/1974 | Nakata et al. | 174/73 R |
| 3,860,741 | 1/1975 | Troccoli | 174/73 R |
| 3,946,143 | 3/1976 | McLoughlin | 174/88 C X |
| 4,034,151 | 7/1977 | Silva et al. | 174/73 R |

FOREIGN PATENT DOCUMENTS

| | | | |
|---|---|---|---|
| 806812 | 2/1969 | Canada | 174/73 R |
| 53-33748 | 9/1978 | Japan | 174/85 |
| 54-139091 | 10/1979 | Japan | 174/85 |
| 313241 | 5/1956 | Switzerland | 174/85 |
| 444253 | 2/1968 | Switzerland | 174/85 |
| 898762 | 6/1962 | United Kingdom | 174/85 |

*Primary Examiner*—Laramie E. Askin
*Attorney, Agent, or Firm*—David Teschner

[57] ABSTRACT

A splice connector for high voltage cables is modified to provide a shield break placed either in the housing or in an adaptor sleeve of the connector and in such a manner as to preserve essentially the overall configuration and dimensions of the housing and adaptor sleeve and locate the shield break in a region of relatively low electrical stress, while providing an unbroken shield over the connection between the cables.

18 Claims, 9 Drawing Figures

SPLICE CONNECTOR WITH SHIELD BREAK

This application is a continuation of application Ser. No. 174,867 filed Aug. 4, 1980 (now abandoned) which in turn is a continuation-in-part of application Ser. No. 970,190 filed Dec. 18, 1978 (abandoned).

BACKGROUND OF THE INVENTION

The present invention relates generally to electrical connectors and pertains, more particularly, to a high voltage splice connector with a shield break, and still more specifically to an improved housing and adaptor sleeve for such a connector, such that the improved housing or adaptor sleeve provides the shield break.

It is known that the current-carrying capacity of cables connected by a high voltage shielded connector can be enhanced by means of a shield break.

The present invention provides a way of increasing the current-carrying capacity of cables connected by the high voltage splice connector of Silva et al. U.S. Pat. No. 4,034,151, commonly assigned herewith, by incorporating a shield break in such a connector. The disclosure of the Silva et al. patent is incorporated herein by reference, and the connector of the Silva et al. patent is hereinafter called the Silva connector.

The Silva connector is used for connecting high voltage cables, each having a conductor, insulation surrounding the conductor and a shield around the insulation. The connector includes a pair of adaptor sleeves for placement one at the terminus of each cable, means for connecting bared portions of the conductors together, and a housing for placement over the adaptor sleeves and over the connecting means to engage the adaptor sleeves along an interface between each adaptor sleeve and the housing and to enclose the connection between the bared portions of the conductors. The Silva connector further includes a heat transfer jacket for placement over the connection between the bared portions of the conductors and having a longitudinal length sufficient to extend longitudinally between the adaptor sleeves and a thickness sufficient to extend radially between the connection and the housing, the jacket being constructed of a material of relatively high thermal conductivity, and complementary means on the heat transfer jacket and the adaptor sleeves for engaging the jacket with each adaptor sleeve to locate and preclude movement of the adaptor sleeves longitudinally relative to one another.

With further reference to the Silva connector, each adaptor sleeve has a portion in the form of a first sleeve part of electrically insulating elastomeric material and a portion in the form of a second sleeve part of conductive elastomeric material. The conductive portion of each adaptor sleeve engages the shield of its associated cable and the adjacent cable insulation and the insulating portion engages the cable insulation. The housing has a central portion in the form of a first tubular housing part of insulating elastomeric material and two end portions in the form of further tubular housing parts of electrically conductive elastomeric material. The conductive end portions of the housing engage the conductive portions of the adaptor sleeves. The outer surface of the central portion of the housing is provided with a covering in the form of another tubular housing part of electrically conductive material, the ends of which overlap and engage the conductive end portions of the housing. Thus, a continuous shielding system across the splice connecton between the shields of the cables is provided by the electrically conductive portions of the adaptor sleeves, the electrically conductive end portions of the housing and the convering of electrically conductive material on the central portion of the housing. The covering on the central portion of the housing may be provided by an electrically conductive heat-shrink tube.

It is a feature of the present invention that the shield break is attained by a simple modification of the housing or of an adaptor sleeve of the Silva connector.

Therefore, an important object of the present invention is to modify the Silva connector to increase the current-carrying capacity of cables connected thereby.

Another important object of the present invention is to modify the Silva connector to include a shield break, thereby to increase the current-carrying capacity of cables connected thereby, A further important object of the present invention is to make a simple modification to the housing of the Silva connector to include a shield break, thereby to increase the current-carrying capacity of cables connected thereby.

A still further object of the present invention is to make a simple modification of one of the adaptor sleeves of the Silva connector to include a shield break, thereby to increase the current-carrying capacity of cables connected thereby.

Still another object of the present invention is to make a simple modification of either the housing or an adaptor sleeve of the Silva connector to include a shield break, the modification being such that the modified housing or adaptor sleeve is interchangeable within the connector with a respective unmodified housing or adaptor sleeve.

Yet another object of the present invention is to modify the Silva connector to include a shield break placed within the connector at a location which still provides an unbroken shield over the central region of the housing, and thus over the connection between the bared cable conductors.

Another object of the present invention is to modify the Silva connector to include a shield break placed within the connector in a region of relatively low electrical stress.

Still another object of the present invention is to modify the Silva connector to include a shield break so placed within the connector and of such a configuration as to enable the overall configuration and dimensions of the housing and adaptor sleeves to remain essentially unchanged.

Yet a further object of the present invention is to modify the Silva connector to include a shield break so located within the connector and of such configuration as not to disrupt the ability of the connector to transfer heat effectively away from the connection between the cables.

Another object of the invention is to modify the Silva connector to include a shield break without departing from conventional tooling and manufacturing techniques as used in the fabrication of the Silva connector.

SUMMARY OF THE INVENTION

The above objects, as well as further objects and advantages, are attained by the present invention which may be described briefly as a splice connector for connecting high voltage cables, each cable having a conductor, insulation surrounding the conductor, and a shield around the insulation, the connector including means for connecting bared portions of the conductors together at the terminus of each cable, the connector comprising a pair of adaptor sleeves for placement of one adaptor sleeve at the terminus of each cable, each adaptor sleeve having an internal surface for engaging a corresponding cable, an external surface, a first sleeve part of insulating elastomeric material and a second sleeve part of conductive elastomeric material integral with the first sleeve part, the second sleeve part including a first end portion located adjacent the internal surface for axially-overlapping juxtaposition with a terminal end portion of the shield of the cable when the adaptor sleeve is placed at the terminus of that cable, and a second end portion located axially opposite the first end portion in axially-overlapping juxtaposition with the external surface of the adaptor sleeve, a housing for placement over the adaptor sleeves, the housing having an inner surface for engaging each adaptor sleeve, the housing including axially opposite ends, a first tubular housing part of insulating elastomeric material extending axially between the opposite ends of the housing and having an outer surface for receiving a second tubular housing part of conductive material for surrounding the first tubular housing part intermediate the opposite ends of the housing in integral engagement with the first tubular housing part, and third tubular housing parts of conductive elastomeric material integral with the first tubular housing part adjacent each said opposite end, each third tubular housing part having a first end portion located in axially-overlapping juxtaposition with a corresponding end portion of the outer surface of the first tubular housing part and a second end portion located adjacent a corresponding end portion of the inner surface for axially-overlapping juxtaposition with a corresponding adaptor sleeve second end portion when the housing is in place over the adaptor sleeves with the first housing part surrounding the connected bared portions of the conductors, and a tubular skirt part of insulating elastomeric material interposed radially between at least two of the axially-overlapping juxtaposed end portions located adjacent one of the opposite ends of the housing when the housing is in place over the adaptor sleeves and the adaptor sleeves are in place over each cable terminus such that said two of the axially-overlapping juxtaposed end portions are elctrically insulated from one another to provide a shield break at the connector.

DESCRIPTION OF PREFERRED EMBODIMENTS

Figure 1:
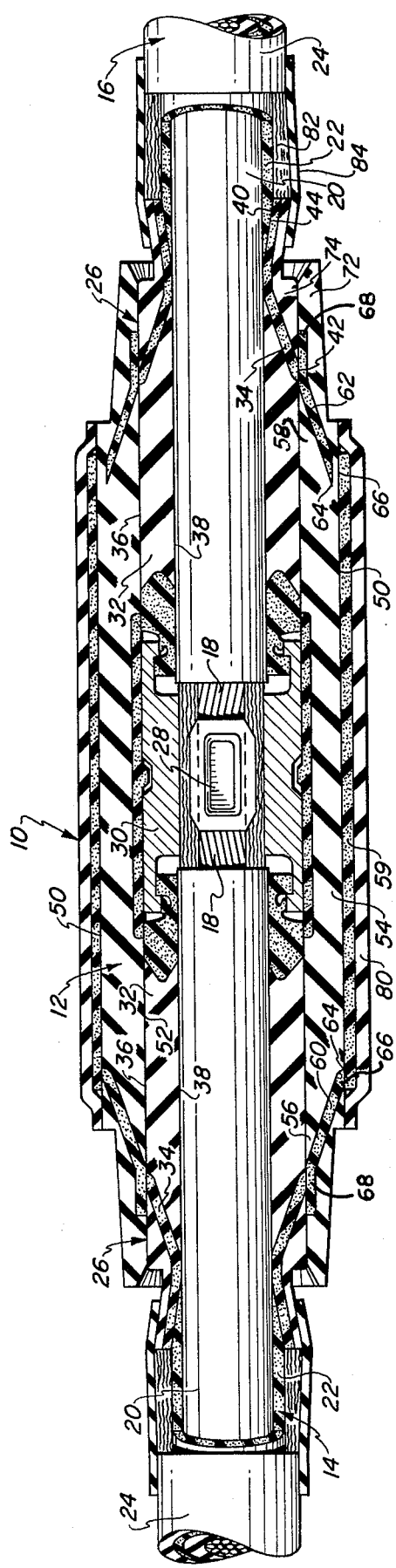
FIG. 1 is a longitudinal view, mostly in cross-section, of a completed splice connection constructed in accordance with the invention.

FIG. 1 shows a completed splice connection 10 constructed in accordance with the present invention and providing a shield break located in an outer housing indicated generally at 12.

The splice connection 10 is assembled between a pair of high voltage cables 14 and 16, each cable having a central conductor 18 surrounded by insulation 20 which, in turn, is surrounded by a conductive shield 22. A jacket 24 of insulating material surrounds the conductive shield 22.

In addition to housing 12, the other components of the splice connection, and the organization thereof, are all essentially as disclosed in the Silva et al. patent and include a pair of adaptor sleeves 26, an electrical contact element in the form of a metallic ferrule 28 connecting bared portions of the conductors 18 at the terminus of each cable 14 and 16, and a heat transfer jacket 30. In some instances a welded connection is used in place of ferrule 28.

Each adaptor sleeve 26 includes a first sleeve part 32 of insulating elastomeric material and a second sleeve part 34 of electrically conductive elastomeric material, sleeve parts 32 and 34 being integrally joined by being molded together. Each adaptor sleeve 26 has an external surface 36 and an internal surface 38. Conductive sleeve part 34 has a first end portion 40 located adjacent the internal surface 38 and an axially opposite second end portion 42 adjacent external surface 36. First end portion 40 of each sleeve part 34 is placed in axially-overlapping juxtaposition with a terminal end portion 44 of shield 22 of each cable 14 and 16 and, in this instance, contacts the shield 22 when connector 10 is assembled in such a way as to make an electrical connection with terminal end portion 44 of shield 22. Second end portion 42 is located in axially-overlapping juxtaposition with external surface 36.

Housing 12 has an outer surface 50 and an inner surface 52 and includes a first tubular housing part 54 of insulating elastomeric material extending axially between opposite ends 56 and 58, and a second tubular housing part 59 of electrically conductive material received over the outer surface 50 intermediate the opposite ends 56 and 58.

Figure 3:
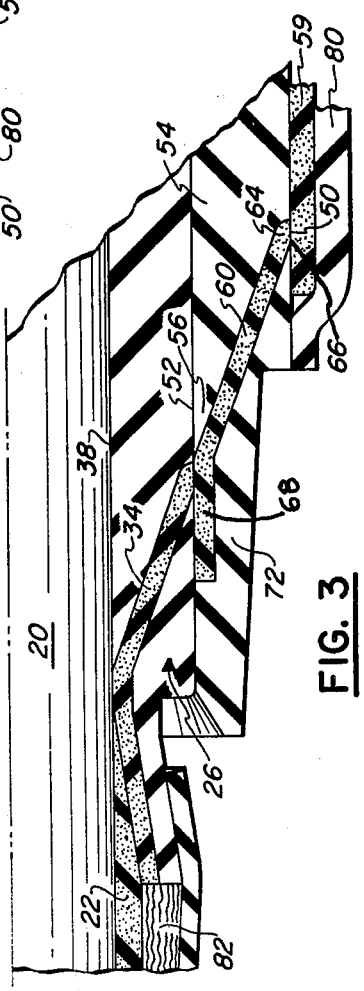
FIG. 3 is an enlarged fragmentary view of a portion of FIG. 1, toward the lefthand end thereof.

Housing 12 further has third tubular housing parts 60 and 62 of electrically conductive elastomeric material, preferably molded integrally with first tubular housing part 54 adjacent the ends 56 and 58 thereof. Each third tubular housing part 60 and 62 has a first end portion 64 located in axially-overlapping juxtaposition with a corresponding end portion 66 of outer surface 50 and a second end portion 68 adjacent inner surface 52 for axially-overlapping juxtaposition with a corresponding second end portion 42 of an adaptor sleeve 26. The second end portion 68 of each third tubular housing part 60 and 62 extends into the inner surface 52 to contact the external surface 36 of corresponding adaptor sleeve 26 and to make an electrical connection between the third tubular housing parts 60 and 62 and the corresponding second sleeve part 34 of the adaptor sleeve 26. Likewise, as best seen in FIG. 3, the first end portion 64 of third housing part 60 extends into the outer surface 50 to contact the second tubular housing part 59 to continue the shield along the housing 12 over the connected bared portions of the conductors 18 of cables 14 and 16.

Figure 2:
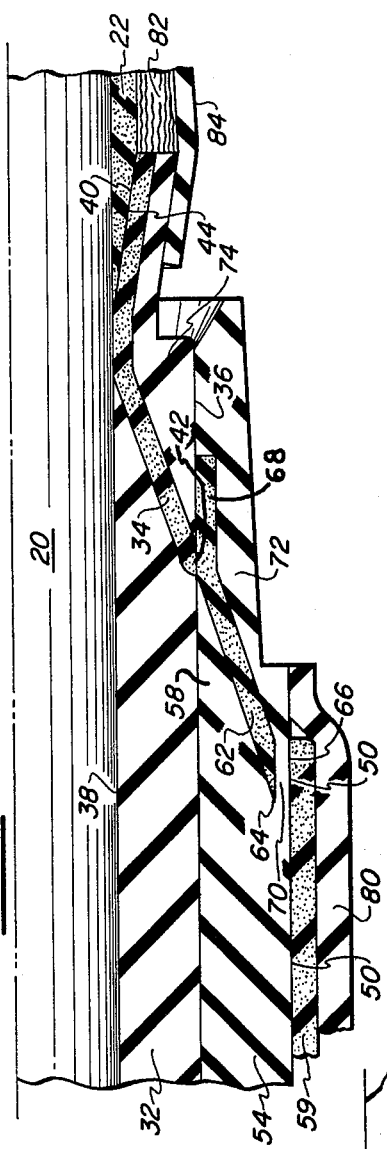
FIG. 2 is an enlarged fragmentary view of a portion of FIG. 1, toward the righthand end thereof.

However, as best seen in FIG. 2, the first end portion 64 of third housing part 62 is spaced radially inwardly from outer surface 50 and a tubular skirt part 70 of insulating elastomeric material is interposed radially between that first end portion 64 and outer surface 50 at a corresponding end portion 66 of outer surface 50. Tubular skirt part 70 thus electrically insulates the first end portion 64 of third housing part 62 from the corresponding overlapped end portion of second tubular housing part 59 to provide a shield break at the connector 10. As shown, tubular skirt part 70 is integral with and preferably is molded unitarily with first tubular housing part 54.

Fourth tubular housing parts 72 of insulating elastomeric material are provided around the third tubular housing parts 60 and 62 for purposes which will be explained more fully below. Preferably, the fourth tubular housing parts 72 are molded integrally with first tubular housing part 54 and each third tubular housing part 60 is substantially embedded within insulating elastomeric material. Likewise, each adaptor sleeve 26 is provided with a third sleeve part 74 of insulating elastomeric material around second sleeve part 34, the third sleeve parts 74 preferably being molded integrally with the second sleeve parts 34 and extending in axially-overlapping juxtaposition with the second sleeve parts 34 between each second sleeve part and the external surface 36 of the corresponding adaptor sleeve 26.

Thus, the shield system of the splice connection 10 shown in FIG. 1 is provided by shield 22 of cable 14, conductive sleeve part 34 of adaptor sleeve 26 associated with cable 14, third tubular housing part 60 of housing 12, second tubular housing part 59 and by shield 22 of cable 16, conductive sleeve part 34 of adaptor sleeve 26 associated with cable 16 and third tubular housing part 62 of housing 12. The shield system is broken by tubular skirt part 70 interposed between first end portion 64 of third tubular housing part 62 and the corresponding overlapping end portion of second tubular housing part 59.

Skirt part 70 can be fabricated easily by means of a simple mold insert which produces outer surface 50, resulting in a radial gap which is filled with insulating elastomeric material when first tubular housing part 54 is molded, thus to form skirt part 70.

The radial dimension of skirt part 70 can be approximately 0.100 inch (2.54 mm).

Where housing 12 is to be used in a splice connection which is to be buried directly in the earth, the shield must be insulated from the conducting earth. Consequently, housing 12 is provided with outer insulation, preferably a heat-shrink tube 80 of insulating material, such as polyvinyl chloride or polyethylene, overlying conductive second tubular housing part 59 and extending beyond the ends of second tubular housing part 59 to join with fourth tubular housing parts 72 which, in turn, are joined with third sleeve parts 74 to insulate the shield from the earth. Such insulation is continued between adaptor sleeves 26 and jackets 24 of cables 14 and 16 by means of insulating tape 82 and a surrounding heat-shrink tube 84.

Figure 5:
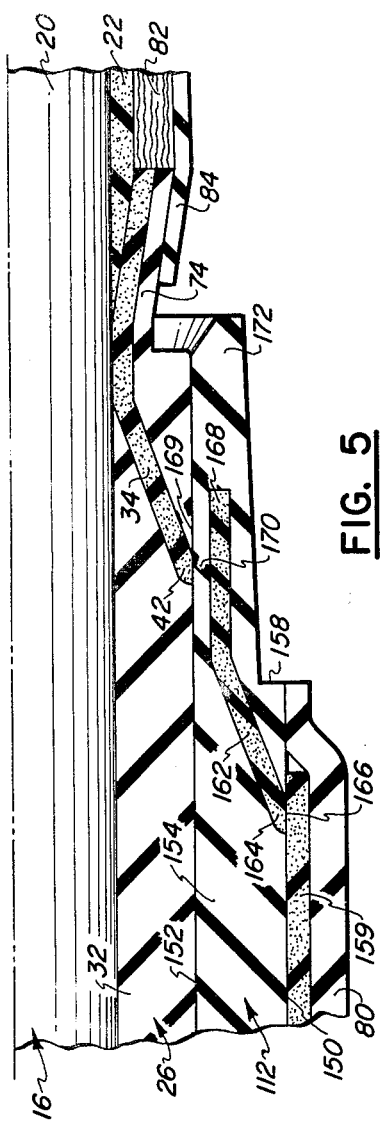
FIG. 5 is an enlarged fragmentary view of a portion of FIG. 4.
Figure 4:
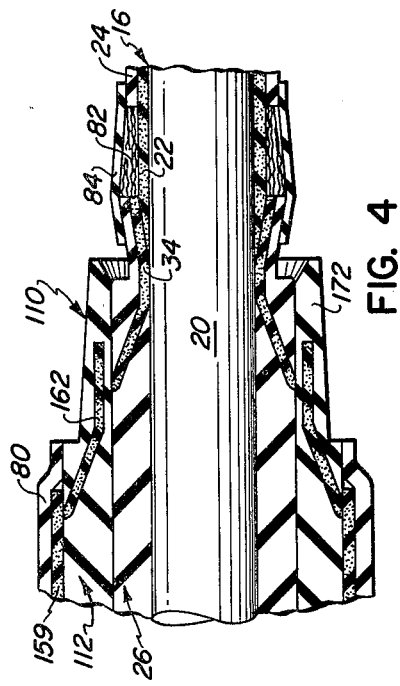
FIG. 4 is a fragmentary longitudinal view, mostly in cross-section, of the righthand end of a splice connection similar to that of FIG. 1, and illustrating another embodiment of the present invention.

Turning now to FIGS. 4 and 5, another embodiment of the invention is illustrated in splice connection 110 which is similar to splice connection 10 in all respects, with the exception of the placement of the shield break. As in splice connection 10, adaptor sleeves 26 are placed over the terminus of cables 14 and 16, but only cable 16 is illustrated in FIGS. 4 and 5, the arrangement at the end of splice connection 110 adjacent cable 14 being the same as that shown in FIGS. 1 and 3.

In the present embodiment, a housing 112 is similar to housing 12 in that housing 112 includes an outer surface 150 and an inner surface 152 and has a first tubular housing part 154 of insulating elastomeric material, with an end 158, and a second tubular housing part 159 of conductive material, preferably a conductive elastomeric material, placed over the outer surface 150. A third tubular housing part 162 of conductive elastomeric material is provided adjacent the end 158 of housing 112 and includes a first end portion 164 located in axially-overlapping juxtaposition with a corresponding end portion 166 of outer surface 150, and a second end portion 168 adjacent inner surface 152 for axially-overlapping juxtaposition with a corresponding second end portion 42 of conductive sleeve part 34 of adaptor sleeve 26.

However, the construction of housing 112 differs from that of housing 12 in that the first end portion 164 of third tubular housing part 162 now extends into outer surface 150 and contacts second tubular housing part 159 to make an electrical connection therewith. But second end portion 168 now is spaced radially outwardly from an end portion 169 of inner-surface 152 and corresponding overlapped end portion 42 of conductive sleeve part 34 of the illustrated adaptor sleeve 26. A tubular skirt part 170 of insulating elastomeric material is interposed radially between second end portion 168 and end portion 169 of inner surface 152 and, hence, between third tubular housing part 162 and the second sleeve part 34 of illustrated adaptor sleeve 26. Tubular skirt part 170 thus electrically insulates the third tubular housing part 162 from the overlapped portion of the second sleeve part 34 and provides a shield break.

A fourth tubular housing part 172 of insulating elastomeric material is provided around the third tubular housing part 162 and preferably is molded integrally with tubular skirt part 170 and first tubular housing part 154 to provide a unitary insulating structure within which third tubular housing part 162 is substantially embedded.

Figure 7:
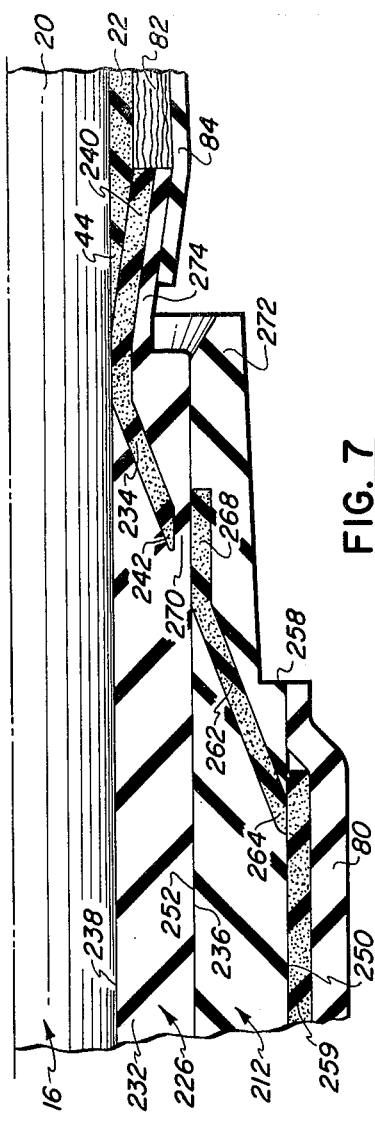
FIG. 7 is an enlarged fragmentary view of a portion of FIG. 6.
Figure 6:
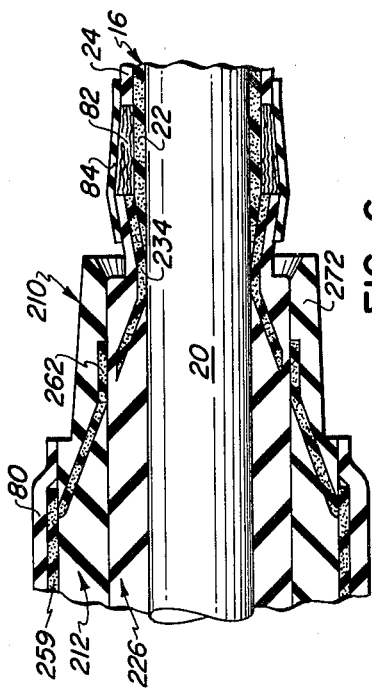
FIG. 6 is a fragmentary longitudinal view, mostly in cross-section, of the righthand end of a splice connection similar to that of FIG. 1, and illustrating still another embodiment of the present invention.

Referring now to FIGS. 6 and 7, still another embodiment of the invention is illustrated in splice connection 210 which is similar to splice connection 10 in all respects, with the exception of the placement of the shield break. As in splice connection 10, an adaptor sleeve 26 is placed over the terminal end of cable 14 and the arrangement between the adaptor sleeve 26 and cable 14 is as depicted in FIGS. 1 and 3.

In the present embodiment, a housing 212 is similar to housing 12, but has been modified somewhat, as will be explained below. Likewise, adaptor sleeve 226, which is placed over cable 16, is similar to adaptor sleeve 26 in that adaptor sleeve 226 includes a first sleeve part 332 of insulating elastomeric material and a second sleeve part 234 of electrically conductive elastomeric material and has an external surface 236 and an internal surface 238.

As before, the first end portion 240 of second sleeve part 234 extends into the internal surface 238 to make contact with the terminal end portion 44 of shield 22 of cable 16. But, in this instance, the second end portion 242 of second sleeve part 234 is spaced radially inwardly from external surface 236, and a tubular skirt part 270 of insulating elastomeric material is interposed radially between the second end portion 242 and the external surface 236. Tubular skirt part 270 thus electrically insulates the second sleeve part 234 from the overlapped portion of the housing 212 and provides a shield break.

In view of the presence of tubular skirt part 270 in adaptor sleeve 226, housing 212 now may be provided with a third tubular housing part 262 of conductive elastomeric material at end 258 of housing 212 constructed precisely like third tubular housing part 60 in that first end portion 264 extends into outer surface 250 to contact second tubular housing part 259, and second end portion 268 extends into inner surface 252 to engage the external surface 236 of adaptor sleeve 226. A fourth tubular housing part 272 of insulating elastomeric material surrounds third tubular housing part 262.

A third sleeve part 274 of insulating elastomeric material is provided around the second sleeve part 234 and preferably is molded integrally with the second sleeve part 234. Third sleeve part 274 may be formed unitarily with tubular skirt part 270 and with first sleeve part 232, so that second sleeve part 234 is substantially embedded in insulating material.

Figure 9:
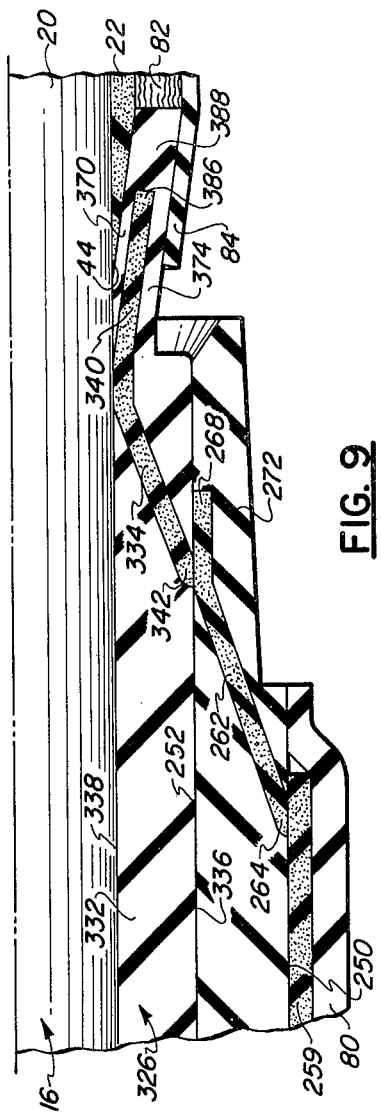
FIG. 9 is an enlarged fragmentary view of a portion of FIG. 8.
Figure 8:
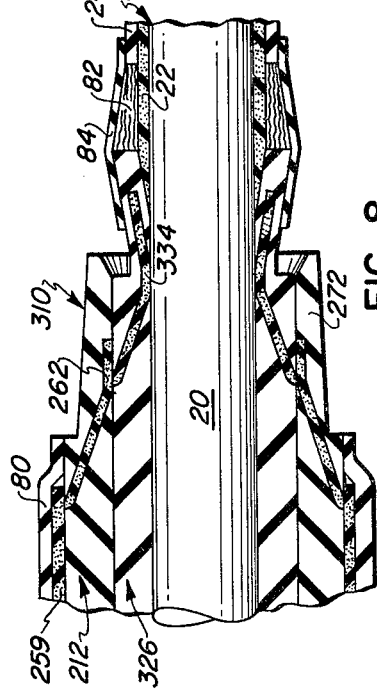
FIG. 8 is a fragmentary longitudinal view, mostly in cross-section, of the righthand end of a splice connection similar to that of FIG. 1, and illustrating yet another embodiment of the present invention.

Turning now to FIGS. 8 and 9, yet another embodiment of the invention is illustrated in splice connection 310 which is similar to splice connections 10, 110 and 210 in all respects, with the exception of the placement of the shield break. As in splice connections 10, 110 and 210, an adaptor sleeve 26 is placed over the terminal end of cable 14 and the arrangement between the adaptor sleeve 26 and cable 14 is as depicted in FIGS. 1 and 3. As in splice connection 210 the housing of connection 310 is the same as housing 212 in that third tubular housing part 262 has first end portion 264 extending into outer surface 250 to contact second tubular housing part 259, and second end portion 268 extending into inner surface 252.

In the present embodiment, the adaptor sleeve 326, which is placed over cable 16, is similar to adaptor sleeve 26 of splice connections 10 and 110 in that adaptor sleeve 326 includes a first sleeve part 332 of insulating elastomeric material and a second sleeve part 334 of electrically conductive elastomeric material and has an external surface 336 and an internal surface 338. As before, the second end portion 342 of second sleeve part 334 extends into the external surface 336 to contact the third tubular housing part 262 at the second end portion 268 thereof. However, the first end portion 340 of second sleeve part 334 is spaced radially outwardly from the internal surface 338 and a tubular skirt part 370 of insulating elastomeric material is interposed radially between the first end portion 340 and the internal surface 338. Tubular skirt part 370 thus electrically insulates the second sleeve part 334 from the terminal end portion 44 of shield 22 of cable 16 and provides a shield break.

A third sleeve part 374 of insulating elastomeric material is provided around the second sleeve part 334 and preferably is molded integrally with the second sleeve part 334. Third sleeve part 374 is extended around the terminal end 386 of the second sleeve part 334 at 388 so as to be molded integrally with the tubular skirt part 370 and enable the second sleeve part 334 to be substantially embedded within insulating material.

The above-described embodiments illustrate the placement of a shield break in several alternate locations within an assembled splice connector of the type shown in the Silva et al. patent. The several alternate locations have relative advantages and disadvantages. For example, the location of the shield break as shown in splice connection 10 has the advantage of being placed along a surface which does not require a close tolerance dimension, as would be required at the location depicted in splice connections 110 and 210, thereby simplifying manufacture. In addition, the shield break in connection 10 is located in a region of relatively low electrical stress, rendering the structure less critical dimensionally. On the other hand, placing the shield break in an adaptor sleeve, as shown in splice connections 210 and 310, has advantages over placement in the housing, as shown in splice connections 10 and 110, in that all of the housings can be constructed identically, for use in a connection with or without a shield break, and only adaptor sleeves need be interchanged. Since adaptor sleeves usually are much smaller than housings, it becomes a more simple and less expensive matter to supply and stock a variety of adaptor sleeves rather than a variety of housings. The resulting economies may dictate the structures shown in splice connectors 210 and 310. Further, although placement of the shield break as shown in connector 310 has the disadvantage of locating the shield break in an area of relatively higher electrical stress, that disadvantage may be outweighed by advantages in ease of manufacture. In addition, the specific conditions encountered at a particular installation site may be dealt with better, utilizing one arrangement rather than another. Hence, each specified location has merit.

It is to be understood that the above detailed description of various embodiments of the invention is provided by way of example only. Various details of design and construction may be modified without departing from the true spirit and scope of the invention as set forth in the appended claims.

The embodiments of the invention in which an exclusive property or privilege is claimed are defined as follows:

1. A splice connector for connecting high voltage cables, each cable having a conductor, insulation surrounding the conductor, and a shield around the insulation, the connector including means for connecting bared portions of the conductors together at the terminus of each cable, said connector comprising:

a pair of adaptor sleeves for placement of one adaptor sleeve at the terminus of each cable, each adaptor sleeve having an internal surface for engaging a corresponding cable, an external surface, a first sleeve part of insulating elastomeric material and a second sleeve part of conductive elastomeric material integral with the first sleeve part, the second sleeve part including a first end portion located adjacent the internal surface for axially-overlapping juxtaposition with a terminal end portion of the shield of the cable when the adaptor sleeve is placed at the terminus of that cable and a second end portion located axially opposite the first end portion in axially-overlapping juxtaposition with the external surface of the adaptor sleeve;

a housing for placement over the adaptor sleeves, the housing having an inner surface for engaging each adaptor sleeve, the housing including axially opposite ends, a first tubular housing part of insulating elastomeric material extending axially between the opposite ends of the housing and having an outer surface for receiving a second tubular housing part of conductive material for surrounding the first tubular housing part intermediate the opposite ends of the housing in integral engagement with the first tubular housing part, and third tubular housing parts of conductive elastomeric material integral with the first tubular housing part adjacent each said opposite end, each third tubular housing part having a first end portion located in axially-overlapping juxtaposition with a corresponding end portion of the outer surface of the first tubular housing part and a second end portion located adjacent a corresponding end portion of the inner surface for axially-overlapping juxtaposition with a corresponding adaptor sleeve second end portion when the housing is in place over the adaptor sleeves with the first tubular housing part surrounding the connected bared portions of the conductors; and a tubular skirt part of insulating elastomeric material interposed radially between at least two of the axially-overlapping juxtaposed end portions located adjacent one of the opposite ends of the housing when the housing is in place over the adaptor sleeves and the adaptor sleeves are in place over each cable terminus such that said two of the axially-overlapping juxtaposed end portions are electrically insulated from one another to provide a shield break at the connector.

2. The invention of claim 1 wherein the tubular skirt part is integral with at least one of the housing and the corresponding adaptor sleeve.

3. The invention of claim 1 or 2 wherein the tubular skirt part is interposed radially between the outer surface of the first tubular housing part and the third tubular housing part adjacent one end of the housing, and the tubular skirt part is unitary with the first tubular housing part.

4. The invention of claim 1 or 2 wherein the tubular skirt part is interposed radially between one of the third tubular housing parts and a corresponding second sleeve part, and the tubular skirt part is unitary with the first tubular housing part.

5. The invention of claim 1 or 2 wherein the tubular skirt part is interposed radially between one of the third tubular housing parts and a corresponding second sleeve part, and the tubular skirt part is unitary with the first sleeve part.

6. The invention of claim 1 or 2 wherein the tubular skirt part is interposed radially between the second sleeve part and the corresponding terminal end portion of the shield of the cable, and the tubular skirt part is integral with the second sleeve part.

7. For use in a splice connector for connecting high voltage cables, each cable having a conductor, insulation surrounding the conductor, and a shield around the insulation, the connector including means for connecting bared portions of the conductors together at the terminus of each cable, and a pair of adaptor sleeves for placement of one adaptor sleeve at the terminus of each cable, each adaptor sleeve having an internal surface for engaging a corresponding cable, an external surface, a first sleeve part of insulating elastomeric material and a second sleeve part of conductive elastomeric material integral with the first sleeve part, the second sleeve part including a first end portion located adjacent the internal surface for axially-overlapping juxtaposition with a terminal and portion of the shield of the cable when the adaptor sleeve is placed at the terminus of that cable and a second end portion located axially opposite the first end portion for axially-overlapping juxtaposition with the external surface of the adaptor sleeve:

a housing for placement over the adaptor sleeves, the housing including axially opposite ends;

a first tubular housing part of insulating elastomeric material extending axially between the opposite ends of the housing and having an inner surface for engaging the adaptor sleeves when the housing is in place over the adaptor sleeves and an outer surface for receiving a second tubular housing part of conductive material for surrounding the first tubular housing part intermediate the opposite ends of the housing in integral engagement with the first tubular housing part;

third tubular housing parts of conductive elastomeric material integral with the first tubular housing part adjacent each said opposite end, each third tubular housing part having a first end portion, the first end portion of one of the third tubular housing parts being spaced radially inwardly from the outer surface of the first tubular housing part, and a second end portion extending to the inner surface of the housing for contact with a corresponding adaptor sleeve second end portion when the housing is in place over the adaptor sleeves with the first tubular housing part surrounding the connected bared portions of the conductors; and a tubular skirt part of insulating elastomeric material interposed radially between the outer surface of the first tubular housing part and the first end portion of said one of the third tubular housing parts such that said one of the third tubular housing parts is electrically insulated from the outer surface of the housing and will be electrically insulated from the second tubular housing part when the second tubular housing part is in place over the outer surface, whereby a shield break is provided at the connector.

8. The invention of claim 7 wherein the tubular skirt part is molded integrally with the first tubular housing part.

9. The invention of claim 7 or 8 wherein the housing includes fourth tubular housing parts of insulating elastomeric material, each fourth tubular housing part being in axially-overlapping juxtaposition with a corresponding third tubular housing part and molded integrally with the housing such that each third tubular housing part is substantially embedded within insulating elastomeric material.

10. A splice connector for connecting high voltage cables, each cable having a conductor, insulation surrounding the conductor, and a shield around the insulation, the connector including means for connecting bared portions of the conductors together at the terminus of each cable, and a pair of adaptor sleeves for placement of one adaptor sleeve at the terminus of each cable, each adaptor sleeve having an internal surface for engaging a corresponding cable, an external surface, a first sleeve part of insulating elastomeric material and a second sleeve part of conductive elastomeric material integral with the first sleeve part, the second sleeve part including a first end portion located adjacent the internal surface for axially-overlapping juxtaposition with a terminal end portion of the shield of the cable when the adaptor sleeve is placed at the terminus of that cable and a second end portion located axially opposite the first end portion for axially-overlapping juxtaposition with the external surface of the adaptor sleeve:

a housing for placement over the adaptor sleeves, the housing including axially opposite ends;

a first tubular housing part of insulating elastomeric material extending axially between the opposite ends of the housing and having an inner surface for engaging the adaptor sleeves when the housing is in place over the adaptor sleeves and an outer surface for receiving a second tubular housing part of conductive material for surrounding the first tubular housing part intermediate the opposite ends of the housing in integral engagement with the first tubular housing part;

third tubular housing parts of conductive elastomeric material integral with the first tubular housing part adjacent each said opposite end, each third tubular housing part having a first end portion extending to the outer surface for contacting the second tubular housing part and a second end portion, the second end portion of one of the third tubular housing parts being spaced radially outwardly from the inner surface of the housing and located for axially-overlapping juxtaposition with a corresponding second adaptor sleeve end portion when the housing is in place over the adaptor sleeves with the first tubular housing part surrounding the connected bared portions of the conductors; and a tubular skirt part of insulating elastomeric material interposed radially between the second end portion of said one of the third tubular housing parts and the inner surface of the housing such that said one of the third tubular housing parts is electrically insulated from the inner surface of the housing and will be electrically insulated from the corresponding adaptor sleeve when the housing is placed over the adaptor sleeve, whereby a shield break is provided at the connector.

11. The invention of claim 10 wherein the tubular skirt part is molded integrally with the first tubular housing part.

12. The invention of claim 10 or 11 wherein the housing includes fourth tubular housing parts of insulating elastomeric material, each fourth tubular housing part being in axially-overlapping juxtaposition with a corresponding third tubular housing part and molded integrally with the housing such that each third tubular housing part is substantially embedded within insulating elastomeric material.

13. For use in providing a shield break in a splice connector for connecting high voltage cables, each cable having a conductor, insulation surrounding the conductor, and a shield around the insulation, the connector including means for connecting bared portions of the conductors together at the terminus of each cable, and a housing for placement over the connected bared portions of the conductors and over the terminus of each cable:

an adaptor sleeve for placement at the terminus of either cable, between the cable and the housing, the adaptor sleeve having an internal surface for engaging the cable;

an external surface for being engaged by the housing when the housing is placed over the terminus of the cable and over the adaptor sleeve;

a first sleeve part of insulating elastomeric material;

a second sleeve part of conductive elastomeric material integral with the first sleeve part, the second sleeve part including a first end portion located at the internal surface for axially-overlapping juxtaposition and contact with a terminal end portion of the shield of the cable when the adaptor sleeve is placed at the terminus of that cable, and a second end portion located adjacent the external surface for axially-overlapping juxtaposition with the housing when the housing is placed over the adaptor sleeve; and a tubular skirt part of insulating elastomeric material interposed radially between the second end portion of the second sleeve part and the external surface of the adaptor sleeve such that the second end portion is electrically insulated from the external surface and will be electrically insulated from the housing when the housing is placed over the adaptor sleeve, whereby a shield break is provided at the connector.

14. The invention of claim 13 wherein the tubular skirt part is molded integrally with the first sleeve part.

15. The invention of claim 13 or 14 wherein the adaptor sleeve includes a third sleeve part of insulating elastomeric material, the third sleeve part being molded integrally with the first sleeve part and extending in axially-overlapping juxtaposition with the second sleeve part, between the second sleeve part and the external surface of the adaptor sleeve.

16. For use in providing a shield break in a splice connector for connecting high voltage cables, each cable having a conductor, insulation surrounding the conductor, and a shield around the insulation, the connector including means for connecting bared portions of the conductors together at the terminus of each cable, and a housing for placement over the connected bared portions of the conductors and over the terminus of each cable:

an adaptor sleeve for placement at the terminus of either cable, between the cable and the housing, the adaptor sleeve having an internal surface for engaging the cable;

an external surface for being engaged by the housing when the housing is placed over the terminus of the cable and over the adaptor sleeve;

a first sleeve part of insulating elastomeric material;

a second sleeve part of conductive elastomeric material integral with the first sleeve part, the second sleeve part including a first end portion located radially outwardly from the internal surface for axially-overlapping juxtaposition with a terminal end portion of the shield of the cable when the adaptor sleeve is placed at the terminus of that cable, and a second end portion extending to the external surface for contacting the housing when the housing is placed over the adaptor sleeve; and a tubular skirt part of insulating elastomeric material interposed radially between the first end portion of the second sleeve part and the internal surface of the adaptor sleeve such that the first end portion is electrically insulated from the internal surface and will be electrically insulated from the terminal end portion of the shield of the cable when the adaptor sleeve is placed at the terminus of the cable, whereby a shield break is provided at the connector.

17. The invention of claim 16 wherein the tubular skirt part is molded integrally with the second sleeve part.

18. The invention of claim 16 or 17 wherein the adaptor sleeve includes a third sleeve part of insulating elastomeric material, the third sleeve part extending axially beyond the first end portion of the second sleeve part so as to be integral with the tubular skirt part and extending radially between the first end portion and the external surface of the adaptor sleeve such that the second sleeve part is substantially embedded within insulating elastomeric material.

* * * * *

UNITED STATES PATENT AND TRADEMARK OFFICE
CERTIFICATE OF CORRECTION

PATENT NO. : 4,424,410
DATED : January 3, 1984
INVENTOR(S) : N.W. Edgerton

It is certified that error appears in the above—identified patent and that said Letters Patent is hereby corrected as shown below:

Column 2, line 4, after "and the", word should read --covering-- not convering

Column 6, line 65, after "sleeve part" number should read --232-- not 332.

Signed and Sealed this

Fifth Day of June 1984

[SEAL]

Attest:

Attesting Officer

GERALD J. MOSSINGHOFF

Commissioner of Patents and Trademarks